United States Patent [19]

Lucke

[11] 4,176,802

[45] Dec. 4, 1979

[54] APPARATUS FOR LAYING BALLS OF STRANDED MATERIAL INTO CUPS OF A CONVEYOR

[75] Inventor: Florian Lucke, Mengen, Fed. Rep. of Germany

[73] Assignee: Lucke Apparatebau GmbH, Mengen, Fed. Rep. of Germany

[21] Appl. No.: 900,917

[22] Filed: Apr. 28, 1978

[30] Foreign Application Priority Data

May 28, 1977 [DE] Fed. Rep. of Germany ....... 2724424

[51] Int. Cl.² ..................... B65H 54/66; B65H 67/00
[52] U.S. Cl. ...................................................... 242/2
[58] Field of Search ................... 242/2, 3, 35.5 A, 53; 57/52

[56] References Cited

FOREIGN PATENT DOCUMENTS

| 1060881 | 3/1967 | United Kingdom | 242/35.5 A |
| 1060882 | 3/1967 | United Kingdom | 242/2 |
| 1111424 | 4/1968 | United Kingdom | 242/2 |
| 1396468 | 6/1975 | United Kingdom | 242/2 |

*Primary Examiner*—Billy S. Taylor
*Attorney, Agent, or Firm*—Olsen and Stephenson

[57] ABSTRACT

At each winding station of a winding machine a ball of stranded material, for example yarn, is lifted from a winding mandrel to a position above a conveyor which has cups for receiving the balls. Pointed ends of curved take-off members engage horizontally into each ball from each side, and when the ball is released it pivots downwardly into a conveyor cup about those pointed ends thereby ensuring alignment of the balls on the conveyor.

5 Claims, 5 Drawing Figures

APPARATUS FOR LAYING BALLS OF STRANDED MATERIAL INTO CUPS OF A CONVEYOR

BACKGROUND OF THE INVENTION

1. Field of the Invention

This invention relates to an apparatus for laying balls of stranded material, for example thread or yarn into the cups of a conveyor belt, which balls are brought into a position above the cups by pivotable arms and are inserted into the cups by take-off members mounted on an operating linkage.

2. Description of the Prior Art

In one known apparatus of this kind (United Kingdom Pat. Specification No. 1,396,468) the take-off members are in the form of relatively long, cantilevered rods which have free ends which are bent over and serve as stops against which the rear end of the ball, lifted by the pivotable arm to a position above the cups of the conveyor belt, bears when the arm returns to its starting position and a ball-holding device on the arm is stripped off the ball. Since these cantilevered rods must extend over the whole length of the ball they may become bent, so that their operation may be impaired. A more important factor is that they do not hold the ball sufficiently firmly when the ball is inserted into the cup, so that the balls are inserted irregularly into the cups. This is a disadvantage if the balls are then delivered from the cups to a packing machine, because of alignment necessary for the packing of the balls is not ensured.

it is a main object of the invention is to provide an apparatus for laying balls of stranded material in the cups of a conveyor belt in such a manner that the balls are always inserted into the cups in exactly the same position, so that they can then be fed to a packing station with a required alignment.

SUMMARY OF THE INVENTION

The invention provides apparatus for laying wound balls in alignment in cups of a conveyor. A pivotable arm carries engaging means which lifts a ball from a winding mandrel to a position above the conveyor where it is engaged horizontally from either side by points on curved take-off members mounted on an operating linkage when the ball is released by the engaging means on the pivotable arm it swings downwardly into a cup on the conveyor. The take-off members then open and the ball settles in required alignment in the cup.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
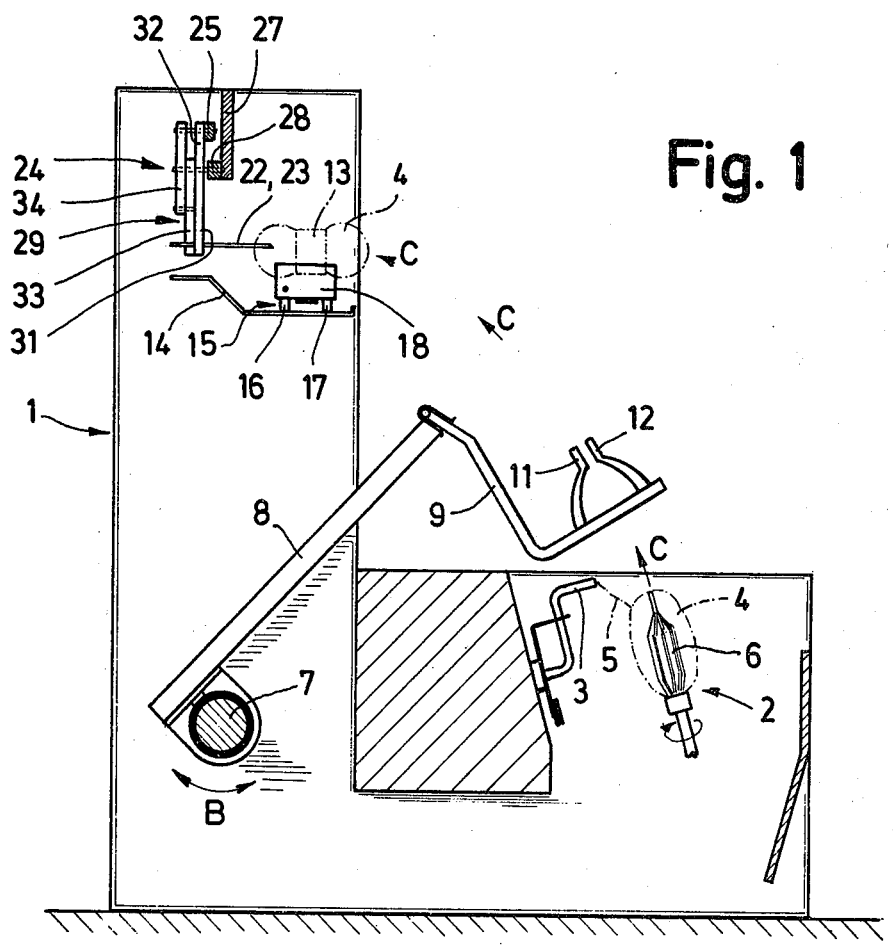
FIG. 1 shows diagrammatically the basic construction of a ball insertion device in side elevation.

On a frame 1 of a ball winding machine a rotationally driven winding mandrel 2 is mounted in a manner known per se and therefore not illustrated, on which mandrel a ball 4 of stranded material, for example yarn, thread, or knitting wool is wound in known manner, for example by means of a rotary winding flyer 3. The winding flyer 3 consists of cranked tube from the end of which the stranded material 5, for example yarn, which is to be wound passes to the ball 4. The winding mandrel 2 usually consists of a collapsible linkage 6 which is disposed inside the ball 4 and enables the diameter of the mandrel to be reduced when the ball 4 has to be pulled off the mandrel 2. This collapsible linkage 6 is also of known construction.

A pivotable arm 8 is fastened on a shaft 7 which is mounted on the machine frame 2 in known manner by means of a driving mechanism, not shown, so as to be rotatable to-and-fro in the direction of the double arrow B. On the free end of the arm 8 there is mounted an angled carrier 9 on which two holding arms or flaps 11, 12 are mounted to receive a label band 13 which is to be slipped over the ball 4.

When the arm 8 is pivoted downwardly the flaps 11, 12 are pushed over the completely wound ball 4 and the label band 13 carried by the flaps is slipped over the ball. When the arm 8 is then pivoted upwardly the flaps 11, 12 pull the ball 4 off the collapsed linkage 6 of the mandrel 2 and carry the ball upwardly in the direction of the arrows C in known manner.

Figure 2:
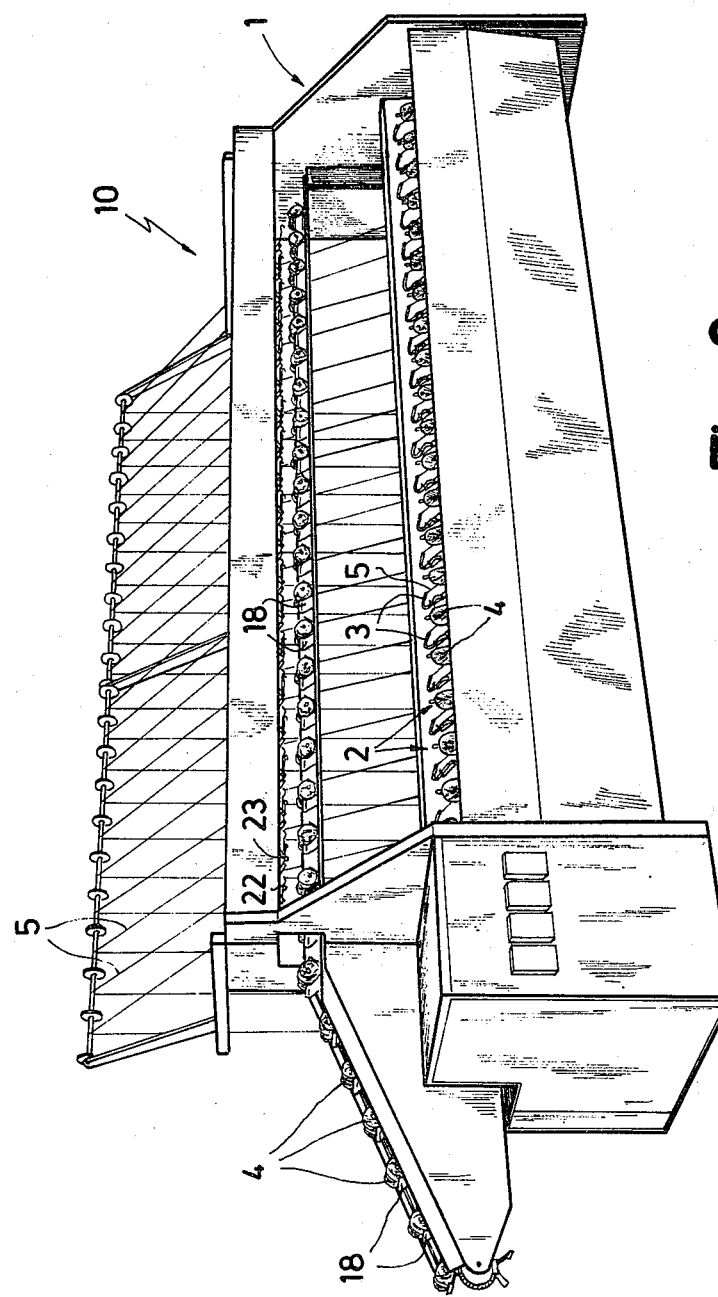
FIG. 2 shows a ball winding machine comprising a plurality of winding stations at each of which the device of FIG. 1 can be mounted.

As shown in FIG. 2, a ball winding machine can have a number of winding stations, for example twenty, of the kind shown in FIG. 1, each with a winding mandrel 2 and a winding flyer 3. An arm 8 provided with flaps 11, 12 is associated with each winding station. For greater clarity only the winding mandrels 2 and winding flyers 3 are indicated in FIG. 2, and the pivotable arms 8 carrying the flaps 11 and 12 are omitted. From supply spools, not shown, and lying behind the machine, the yarn 5 which is to be wound is introduced by means of guide elements from the rear into the winding flyer 3, and as shown in FIG. 1 the yarn is fed out from the front end of the winding flyers towards the ball 4.

As shown in FIG. 1, one side of an endless conveyor 15 is situated in the region above the shaft 7 carrying the arms 8. The conveyor 15 is supported by a stationary support 14 and extends horizontally and substantially parallel to the axis of the shaft 7 as shown in FIG. 2. The conveyor 15 may for example comprise two chains 16 and 17 to which there are fastened cups 18 which are spaced apart from one another for receiving the balls 4. As indicated in FIG. 1, the balls 4 when stripped off the mandrels 2 are carried by the pivotable arms 8 to positions above the cups 18 in such a way that the balls are held by the flaps 11, 12 substantially horizontally at a predetermined distance above the bottoms of the cups.

Figure 3:
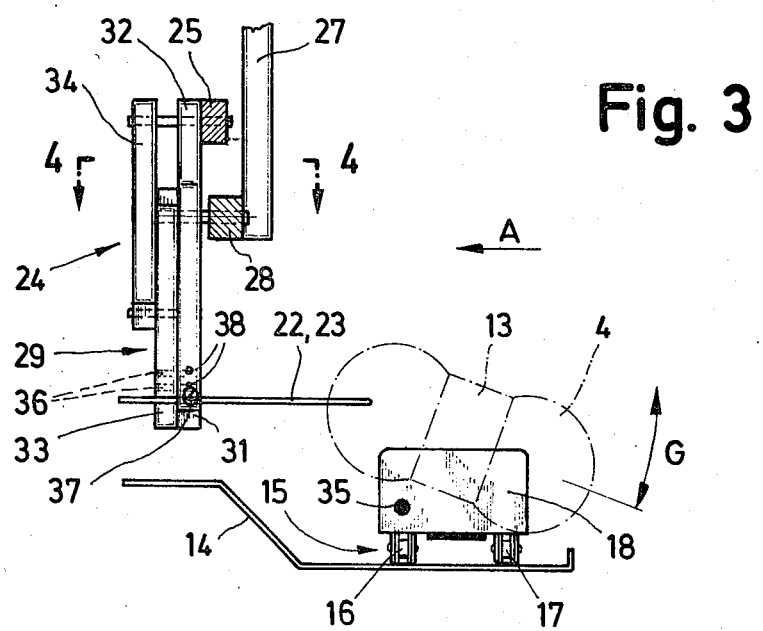
FIG. 3 is a partial view on a larger scale of the device shown in FIG. 1.
Figure 4:
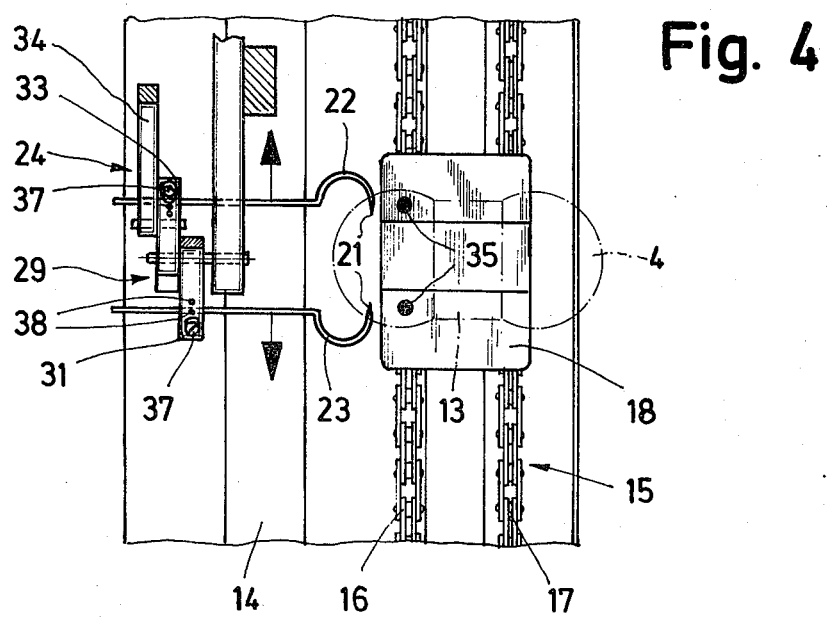
FIG. 4 is a view in section on line 4—4 of FIG. 3.

In order to hold each balls 4 above a cup 18 when the arm carrying the flaps 11 and 12 pivots downwardly so that the flaps 11, 12 are detached from the ball, take-off members are provided, which will be described below with reference to FIGS. 3, 4 and 5.

Figure 5:
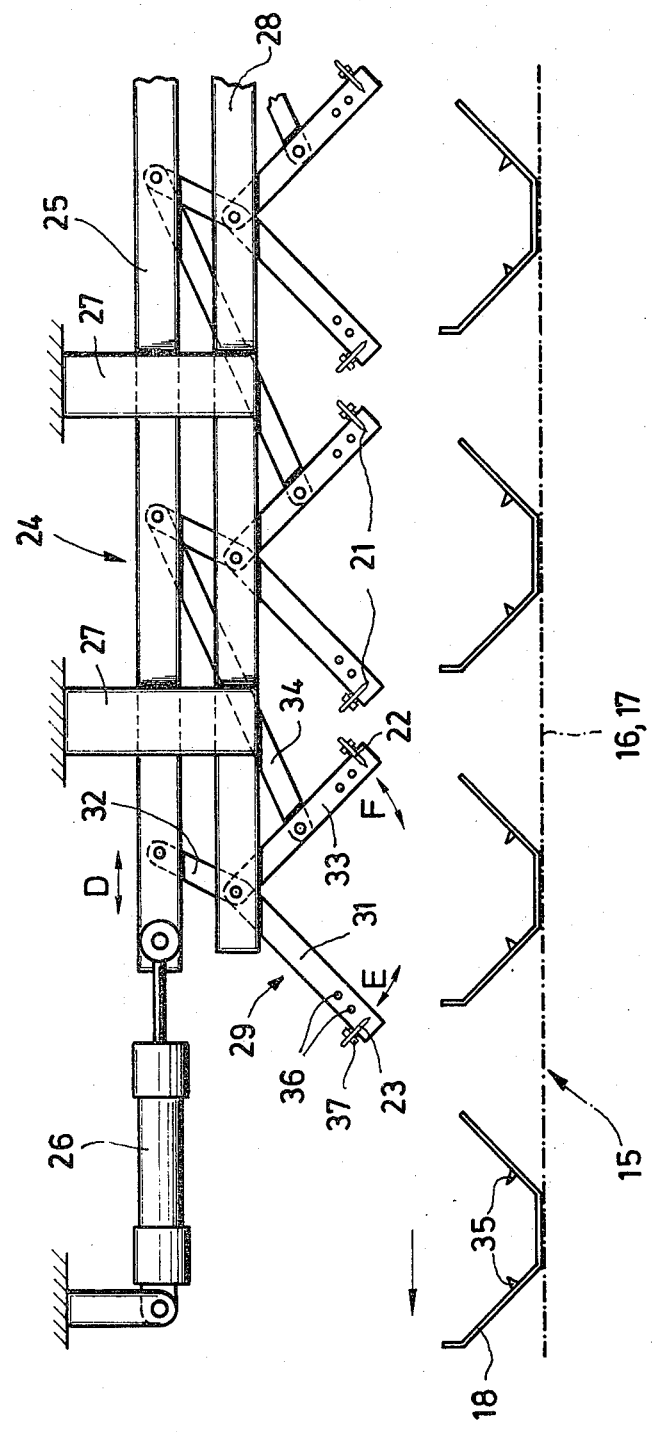
FIG. 5 is a front view of the apparatus in the direction of the arrow A of FIG. 3.

The take-off members are curved take-off hooks 22, 23 which have points 21 and are disposed on an operating linkage 24, FIG. 5. This linkage comprises a first bar 25 which is movable horizontally to-and-fro inside stationary carriers 27 in the direction of the double arrow D by means of a driving device, for example a hydraulic cylinder 26. On another bar 28, which is stationary and carried by the carriers 27, slightly bent levers 29 are pivotably mounted. On the free arm 31 of each of the levers 29 there is fastened a take-off hook 23. The other arm 32 of each lever 29 is pivotally connected to the movable bar 25. When therefore the bar 25 is moved to-and-fro in the direction of the arrow D, the take-off hook 23 moves in the direction of the double arrow E. Single-armed levers 33, which at their free ends carry the other take-off hooks 22, are each pivotally mounted on the stationary bar 28, on the same axis as the levers 29. Approximately in the middle of each lever 33 there is an articulated strut which at its other end is rotatably mounted on the movable bar 25. When therefore the bar 25 is moved to-and-fro in the direction of the arrow D, the take-off hooks 22 moves in the direction of the double arrow F.

When each ball 4 is held by the flaps 11, 12 in a substantially horizontal position above one of the cups 18, as shown in FIG. 1 the take-off hooks 22, 23 are swung towards one another by the operation of the linkage 24, so that their points penetrate from two sides into the ball and hold it fast. When the flaps 11, 12 are now pivoted back, they slip over and off the ball 4 which is held back by the hooks 22, 23. The rear portion of the ball 4 therefore falls downwards through the angular distance indicated by the arrow G in FIG. 3 and is supported from underneath on the bottom of the cup 18. The points of the take-off hooks 22, 23, which have penetrated into the ball 4, support the ball like a pendulum about an accurately defined axis of rotation extending between the points. When the linkage 24 is thereupon operated to swing the hooks 22, 23 away from one another so that they are detached from the ball, the front part of the ball 4 also drops into the cup 18. It has been found that in this way the balls 4 cn be accurately deposited in the cups 18 in such a manner that they can always be carried away by the conveyor belt 15 in exactly the same position and with exactly the same alignment. Irregularities such as occurred with the previously mentioned stops, which acted on the rear side of the balls and were used as take-off members, are eliminated ny the device according to the invention.

As shown in FIGS, 3, 4, and 5, pointed projections 35 are provided, projecting inwardly, on the side walls of the cups 18, which side wall extend obliquely upwards. When the front part of the ball drops off the hooks 22, 23 these projections 35 penetrate into the ball and secure it in the cup during transport. The position of the ball thus cannot change during its transport in the cup.

The take-off hooks 22, 23 are adjustably mounted on the levers 29, 33 in such a manner that they can accomodate different sizes of balls. For this purpose the free ends of the levers 29, 33 have a plurality of bores 36 which lie side-by-side and into which the take-off hooks 22, 23 can be inserted selectively depending on the size of the ball. Adjusting screws are screwed into threaded holes 38 associated with the respective bores 36 to secure the hooks 22, 23. This mounting is always effected in such a manner that the points 21 of the hooks project sufficiently far beyond the levers 29, 33 to enable them to penetrate in a predetermined position into a ball of a predetermined size.

The balls 4 which are uniformly inserted into the cups 18 in two pivoting movements are carried away by the conveyor 15, to the left in FIG. 2, out from the winding machine 10 at its left hand side as shown in FIG. 2, and are then passed on to a packing station or the like.

I claim:

1. In a winding machine for winding walls of stranded material having a conveyor including cups in which wound balls are laid for conveying from the machine, a winding station on one side of the conveyor having a winding flyer and a mandrel for winding a ball of stranded material, an improved apparatus for laying balls of stranded material in cups of the conveyor, comprising a pivotable arm pivotally mounted at its one end and carrying at its free end engagement means located at said one side of the conveyor for engaging on said mandrel a ball having opposite polar ends to bring the ball into position above a cup of the conveyor with the polar ends aligned transversely of the conveyor, an operating linkage mounted adjacent to the conveyor and including a pair of take-off members having points at the ends of the members, said points being located on the other side and above the conveyor, said points being movable toward and away from each other and located relative to said engagement means when the engagement means support the ball above a cup so that the points can be moved to penetrate into said ball adjacent to one polar end thereof and provide between them a horizontal axis on the other side of said conveyor from said engagement means for subsequent pivotal movement of the other polar end of the ball, said points constituting the sole engagement means of the take-off members for engaging the ball, and means for operating the linkage whereby the points on the take-off members are pressed into a ball that has been carried by the pivotable arm to a position above a cup of the conveyor, so that when the ball is released by said engagement means of the pivot arm said other polar end pivots downwardly into the cup about the horizontal axis provided by said points.

2. An apparatus according to claim 1, wherein said operating linkage includes a plurality of mounting means for said take-off members for selective relocation of said take-off members to accomodate different sizes of balls.

3. An apparatus according to claim 1, wherein the walls of each cup of the conveyor have pointed projections adjacent to said one side of the conveyor for engaging a ball which pivots downwardly into the cup to ensure alignment of the ball on the conveyor when it is released by said take-off members.

4. An apparatus according to claim 3, wherein said operating linkage includes a plurality of mounting means for said take-off members for selective relocation of said take-off members to accomodate different sizes of balls.

5. A winding machine for winding balls of stranded material, comprising a conveyor including cups in which wound balls are laid for conveying from the machine, a plurality of winding stations located to one side of said conveyor, each winding station having a collapsible mandrel and a winding flyer for winding a ball of stranded material with a polar axis, and apparatus for laying balls of stranded material wound at said stations in the cups of the conveyor, said apparatus including at each winding station, a pivotable arm pivotally mounted at its one end and carrying at its free end engagement means for engaging while on said mandrel a ball having opposite polar ends and to bring the ball from said one side of the conveyor into position above a cup of the conveyor with the polar ends aligned transversely of the conveyor, an operating linkage mounted adjacent to the conveyor on the other side thereof, said operating linkage including a pair of curved take-off members having points at the ends of the members located above said other side of the conveyor and arranged to be pressed toward each other from the fore and aft directions of the conveyor horizontally into one polar end of a ball held by said engagement means above a cup, said points constituting the sole engagement means of the take-off members for engaging the ball, said points being located relative to said engagement means so that the points penetrate into said ball adjacent to one polar end thereof and provide between them a horizontal axis extending along said other side of the conveyor for subsequent pivotal movement of the other polar end of the ball, and means for operating the linkage whereby the points on the take-off members are pressed into a ball that has been carried by the pivotable arm to a position above the cup of the conveyor, so that when the ball is released by said engagement means of the pivotable arm said other polar end pivots downwardly into the cup about the horizontal axis provided by said points.

* * * * *